(12) United States Patent
Origlia

(10) Patent No.: US 9,472,991 B2
(45) Date of Patent: Oct. 18, 2016

(54) ELECTRIC MOTOR FOR THE COOLING FAN OF A VEHICLE

(71) Applicant: Johnson Electric S.A., Murten (CH)

(72) Inventor: Aulo Origlia, Asti (IT)

(73) Assignee: JOHNSON ELECTRIC S.A., Murten (CH)

( * ) Notice: Subject to any disclaimer, the term of this patent is extended or adjusted under 35 U.S.C. 154(b) by 187 days.

(21) Appl. No.: 13/715,274

(22) Filed: Dec. 14, 2012

(65) Prior Publication Data

US 2013/0154415 A1   Jun. 20, 2013

(30) Foreign Application Priority Data

Dec. 15, 2011   (IT) .......................... TO2011A001159

(51) Int. Cl.
| | |
|---|---|
| H02K 5/06 | (2006.01) |
| H02K 1/30 | (2006.01) |
| H02K 9/06 | (2006.01) |
| H02K 5/16 | (2006.01) |
| H02K 5/167 | (2006.01) |
| H02K 5/173 | (2006.01) |
| H02K 1/27 | (2006.01) |

(52) U.S. Cl.
CPC ........... *H02K 5/06* (2013.01); *H02K 1/30* (2013.01); *H02K 9/06* (2013.01); *H02K 1/2786* (2013.01); *H02K 5/161* (2013.01); *H02K 5/163* (2013.01); *H02K 5/1672* (2013.01); *H02K 5/173* (2013.01); *H02K 5/1732* (2013.01); *H02K 5/1735* (2013.01); *H02K 5/1737* (2013.01)

(58) Field of Classification Search
CPC ............. H02K 5/06; H02K 1/30; H02K 9/06
USPC .................................................... 310/89, 156
See application file for complete search history.

(56) References Cited

U.S. PATENT DOCUMENTS 4,883,408 A * 11/1989 Borcherding ............... 416/93 R
6,081,057 A *  6/2000 Tanaka .................... F16C 21/00
                                                  310/156.04

(Continued)

FOREIGN PATENT DOCUMENTS

EP           1624230 A2 *  2/2006

*Primary Examiner* — Terrance Kenerly
*Assistant Examiner* — Rashad Johnson
(74) *Attorney, Agent, or Firm* — MUncy, Geissler, Olds & Lowe, P.C.

(57) ABSTRACT

A motor for a cooling fan of a vehicle has a rotor including a driving shaft mounted so as to be rotatable in a stator and a bowl-shaped metal case, having a lateral skirt wall which extends around the stator, and having a bottom wall in which there is constructed a tubular fixing formation through which the shaft extends and which is fixed to the shaft. The tubular fixing formation of the rotor case has an internal diameter which is greater than the diameter of the driving shaft. The motor further has an intermediate insert including a tubular portion which is fixed to the shaft and on which there is fixed the tubular formation of the rotor case, and a transverse connecting portion which extends adjacent to the external surface of the bottom wall of the rotor case, and which is connected or connectable to the impeller.

6 Claims, 2 Drawing Sheets

(56) References Cited

U.S. PATENT DOCUMENTS

| | | | |
|---|---|---|---|
| 6,093,984 A | 7/2000 | Shiga et al. | |
| 6,853,102 B2 | 2/2005 | Itaya et al. | |
| 7,839,038 B2* | 11/2010 | Simofi-Ilyes | H02K 5/06 310/402 |
| 8,057,195 B2* | 11/2011 | Lee | F04D 29/263 310/58 |
| 2001/0013726 A1* | 8/2001 | Katagiri | H02K 5/1675 310/67 R |
| 2004/0126232 A1* | 7/2004 | Lin | F04D 25/0613 415/220 |
| 2005/0140232 A1* | 6/2005 | Lee et al. | 310/156.26 |
| 2006/0208590 A1* | 9/2006 | Lin | H02K 1/30 310/91 |
| 2007/0024135 A1* | 2/2007 | Simofi-Ilyes | H02K 5/06 310/89 |
| 2007/0138902 A1* | 6/2007 | Ahn | D06F 37/304 310/261.1 |
| 2007/0163306 A1* | 7/2007 | Kim | D06F 37/304 68/140 |
| 2008/0067899 A1* | 3/2008 | Son | G11B 25/043 310/67 R |
| 2008/0127671 A1* | 6/2008 | Kim et al. | 62/467 |
| 2008/0174212 A1* | 7/2008 | Rudel | H02K 29/08 310/68 B |
| 2009/0102301 A1* | 4/2009 | Rogelein | H02K 5/1672 310/90 |
| 2009/0148086 A1* | 6/2009 | Kuo et al. | 384/440 |
| 2011/0057527 A1* | 3/2011 | Mori | C10M 169/00 310/90 |
| 2012/0048670 A1* | 3/2012 | Smith | F16D 37/02 192/21.5 |

* cited by examiner

ELECTRIC MOTOR FOR THE COOLING FAN OF A VEHICLE

CROSS REFERENCE TO RELATED APPLICATIONS

This non-provisional patent application claims priority under 35 U.S.C. §119(a) from Patent Application No. TO2011A001159 filed in Italy on Dec. 15, 2011.

FIELD OF THE INVENTION

This invention relates to an electric motor and in particular, to an electric motor for driving an impeller of a fan for a heat exchanger of a motor vehicle.

BACKGROUND OF THE INVENTION

More specifically, the present invention relates to an electric motor of the type comprising, in a manner known per se, a stator and a rotor, in which the rotor in turn comprises a cylindrical driving shaft mounted so as to be rotatable in the stator and a bowl-shaped metal case having a lateral skirt wall which extends around the stator, and having a bottom wall in which there is constructed a tubular fixing formation through which the shaft extends and which is fixed to the shaft.

FIG. 1 of the appended drawings partially and schematically illustrates an electric motor M of this type, constructed according to the prior art. Motor M comprises a stator S which is illustrated with broken lines, and a surrounding rotor R. Rotor R comprises a cylindrical driving shaft 1 which is mounted so as to be rotatable in the stator S with interposition of bearings 2 of a type known per se. The rotor R further comprises a substantially bowl-shaped metal case 3 having a lateral skirt wall 3a which extends around the stator and carries permanent magnets 4, and having a bottom wall 3b in which there is provided a tubular central fixing formation 5 which is directed towards the stator S, by means of drawing. The tubular formation of the case 3 is fixed to the shaft 1, for example, by means of an interference fit.

The use of electric motors according to the prior art of the type set out above with reference to FIG. 1 involves problems connected with the concentration of the loads in the central region of the case of the rotor, in particular in the region immediately surrounding the tubular formation by means of which the case is fixed to the driving shaft.

Hence there is a desire for a solution which allows those disadvantages of the motors according to the prior art to be overcome.

SUMMARY OF THE INVENTION

Accordingly, in one aspect thereof, the present invention provides an electric motor, in particular for driving an impeller of a fan for a heat exchanger of a motor vehicle, comprising a stator and a rotor, wherein the rotor comprises: a driving shaft mounted so as to be rotatable in the stator; a substantially bowl-shaped metal case, having a lateral skirt wall which extends around the stator, and having a bottom wall in which there is constructed a tubular fixing formation, through which the driving shaft extends and which is fixed to the driving shaft, the tubular fixing formation having an internal diameter which is greater than the diameter of the driving shaft; and an intermediate insert comprising a tubular portion fixed to the driving shaft and to which there is fixed the tubular formation of the rotor case.

Preferably, the insert has a transverse connecting portion which extends adjacent to an external surface of the bottom wall of the rotor case, and which is connected or connectable to the impeller.

Preferably, the insert is made of metal.

Preferably, the transverse connecting portion of the intermediate insert has a shape with a plurality of lobes, in particular three lobes, in which each lobe is adapted to be connected to the impeller.

Preferably, the transverse connecting portion has three lobes.

Alternatively, the transverse connecting portion of the intermediate insert is substantially of disc-like form.

Preferably, the internal diameter of the tubular formation of the rotor case is at least 1.5 times the external diameter of the driving shaft.

Optionally, the internal diameter of the tubular formation of the rotor case is between 1.5 and 2 times the external diameter of the driving shaft.

Preferably, the internal diameter of the tubular formation of the rotor case is approximately 1.75 times the external diameter of the driving shaft.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and, features shown in the figures are generally chosen for convenience and clarity of presentation and are not necessarily shown to scale. The figures are listed below.

DETAILED DESCRIPTION OF THE PREFERRED EMBODIMENT

Figure 1:
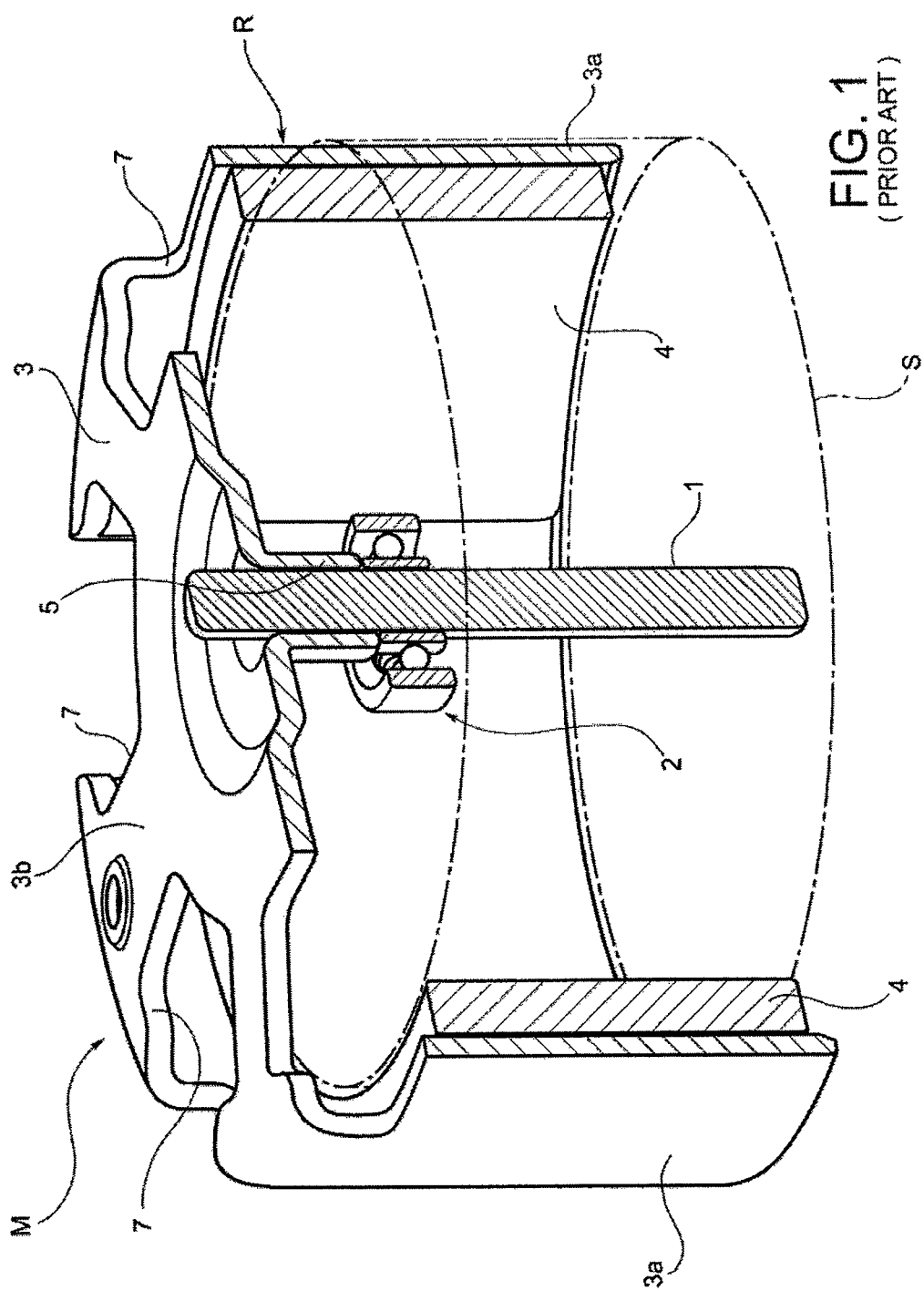
FIG. 1, which has already been described is a partial perspective view, partially sectioned, of an electric motor according to the prior art.
Figure 2:
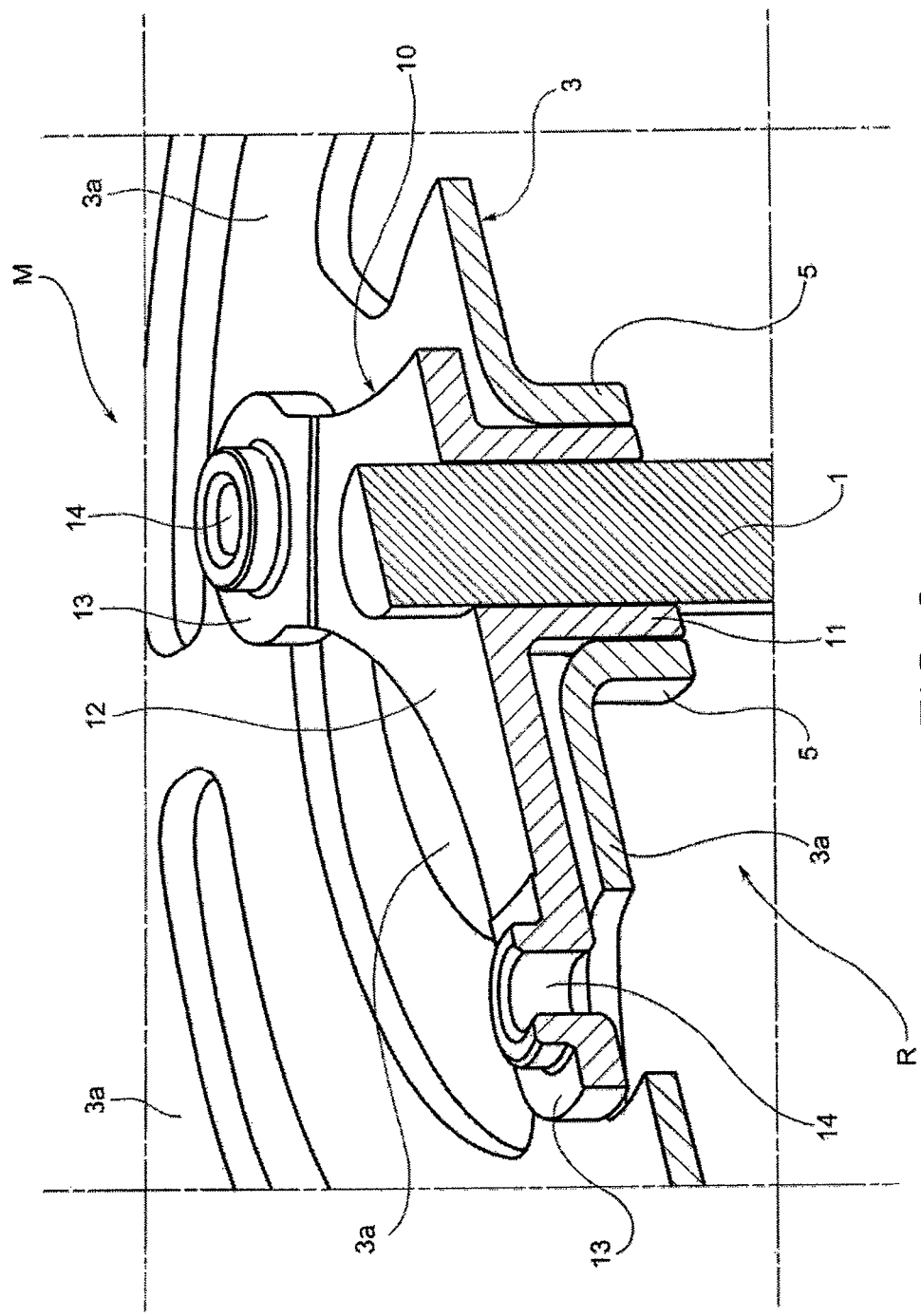
FIG. 2 is a partial perspective view, partially sectioned, of an electric motor constructed in accordance with the present invention.

With reference to FIG. 2, in a motor M according to the preferred embodiment of the present invention, the case 3 has a tubular formation 5 which has an internal diameter greater than the diameter of the driving shaft 1. Interposed between the driving shaft 1 and the case 3 is an intermediate insert which is generally designated 10 in FIG. 2. The insert which may be constructed, for example, from metal, has a tubular portion 11 whose transverse dimensions are such that it can be fixed to the driving shaft 1, and to which the tubular formation 5 of the rotor case 3 is in turn fixed.

By way of example, the internal diameter of the tubular formation 5 of the rotor case 3 may be between 1.5 and 2 times, and preferably in the order of approximately 1.75 times, the external diameter of the driving shaft. The shaft has, for example, a diameter of 8 mm and correspondingly the internal diameter of the tubular formation 5 of the rotor case 3 is preferably in the order of approximately 14 mm. For some applications, it may be desirable for the internal diameter of the tubular formation to be more than 2 times the external diameter of the driving shaft.

The intermediate insert 10 further has a transverse connecting portion 12 which extends adjacent to the external surface of the bottom wall 3a of the rotor case 3. The insert is or can be connected to the impeller of a fan associated with a heat exchanger of a motor vehicle by the connecting portion. The connection may be achieved by means of screws or by means of inclusion of the transverse connecting portion of the insert 10 in the impeller in the course of the stamping operation thereof.

However, the connection may also be brought about in other manners which are known per se.

In the embodiment illustrated in FIG. 2, the transverse connecting portion 12 of the intermediate insert 10 has a configuration generally comprising a plurality of lobes, in particular three lobes, and each lobe 13 has a respective opening 14, for the passage of screws or other fixing members which are known per se and are not illustrated.

Alternatively, the transverse connecting position 12 of the intermediate insert 10 could have, for example, a substantially disc-like shape.

Owing to the presence of the intermediate insert 10 and in particular the tubular portion 11 thereof, the connection diameter is effectively increased between the driving shaft 1 and the tubular portion 5 of the rotor impeller 3. This involves a substantial increase in the strength of the connection and allows a reduction in the tolerances and the losses of equilibrium, as simulations and tests carried out by the Applicant have positively confirmed.

Although the invention is described with reference to one preferred embodiment, given purely by way of a non-limiting example, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor for driving an impeller of a fan for a heat exchanger of a motor vehicle, comprising:
   a stator; and
   a rotor,
   wherein the rotor comprises:
      a driving shaft mounted so as to be rotatable in the stator;
      a substantially bowl-shaped metal case, having a lateral skirt wall which extends around the stator, and having a bottom wall in which there is constructed a tubular fixing formation, through which the driving shaft extends and which is fixed to the driving shaft, the tubular fixing formation having an internal diameter which is greater than the diameter of the driving shaft; and
      an intermediate insert comprising a tubular portion fixed to the driving shaft and to which there is fixed the tubular formation of the rotor case,
   wherein the insert has a transverse connecting portion which extends along an external surface of the bottom wall of the rotor case and has a shape of a flat disk with at least one and no more than three lobes extending outward from the flat disk, each of the lobes comprising a through hole configured to receive a fixing member to connect the insert to the impeller, and
   wherein the tubular portion of the intermediate insert extends perpendicular to the transverse connecting portion.

2. The electric motor of claim 1, wherein the insert is made of metal.

3. The electric motor of claim 1, wherein the transverse connecting portion has three lobes.

4. The electric motor of claim 1, wherein the internal diameter of the tubular formation of the rotor case is at least 1.5 times the external diameter of the driving shaft.

5. The electric motor of claim 1, wherein the internal diameter of the tubular formation of the rotor case is between 1.5 and 2 times the external diameter of the driving shaft.

6. The electric motor according to claim 1, wherein the internal diameter of the tubular formation of the rotor case is approximately 1.75 times the external diameter of the driving shaft.

* * * * *